UNITED STATES PATENT OFFICE.

HERMANN ENDEMANN, OF BROOKLYN, ASSIGNOR TO THE AMERICAN CARBONATE COMPANY, OF NEW YORK, N. Y.

PROCESS OF MAKING LIGHT CARBONATE OF MAGNESIA.

SPECIFICATION forming part of Letters Patent No. 534,213, dated February 12, 1895.

Application filed November 23, 1893. Serial No. 491,786. (No specimens.)

*To all whom it may concern:*

Be it known that I, HERMANN ENDEMANN, a citizen of the United States, residing at Brooklyn, in the county of Kings and State of New York, have invented new and useful Improvements in the Manufacture of Light Carbonate of Magnesia, of which the following is a specification.

This invention relates to a process of manufacturing light carbonate of magnesia, known in chemical language as hydrated basic carbonate of magnesia, in a simple and economical manner.

The following is an example in which my invention can be carried out. The parts are by weight. I take ten parts of magnesia and add to the same about thirty-two parts of bicarbonate of soda and a large excess, say about two hundred and fifty parts of water at about 35° centigrade, and while agitating I gradually raise the temperature to about 65° centigrade. I then pour the mixture upon a filter, wash with boiling water, collect and dry. In place of bicarbonate of soda I can use bicarbonate of potash, using for ten parts of magnesia about thirty-nine parts of bicarbonate of potash.

When using the quantities of magnesia, bicarbonate of soda and water above stated the reaction by which the light carbonate of magnesia is produced, can be illustrated by the following equation:

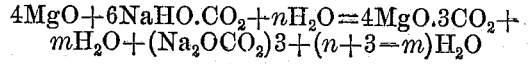

where $m\mathrm{H}_2\mathrm{O}$ represents the quantity of water which combines with the carbonate of magnesia formed, and $n\mathrm{H}_2\mathrm{O}$ the quantity of water which has been added at the beginning to the ten parts of magnesia and thirty-two parts of bicarbonate of soda to which must be added three equivalents of water which are formed during the reaction. The quantity of water contained in the carbonate of magnesia and designated in the above formula by $m\mathrm{H}_2\mathrm{O}$ varies from $5\mathrm{H}_2\mathrm{O}$ to $9\mathrm{H}_2\mathrm{O}$ according to the temperature during the preparation and drying.

When thirty-four parts of bicarbonate of soda are used instead of thirty-two parts as stated in the above example, the formula which illustrates the reaction is as follows:

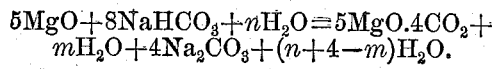

If bicarbonate of potash is used instead of bicarbonate of soda in this last named example, the quantity of bicarbonate of potash must be increased from thirty-nine parts to 41.5 parts.

The quantity of water taken must be about twenty-five times the quantity of magnesia but may be more but not much less for the reason that if the quantity of water is decreased beyond a certain limit, a product is obtained which does not possess the properties of the light or hydrated basic carbonate of magnesia.

The quantity of bicarbonate of soda or potash used may also be decreased but by such decrease the final product obtained is heavier than the product which is obtained by working in about the proportions stated.

I am aware that a hydrated carbonate of magnesia containing an admixture of hydrate of magnesia has been produced by exposing magnesia to the action of an alkaline bicarbonate or an alkaline sesquicarbonate and I do not broadly claim as my invention the treatment of magnesia with an alkaline bicarbonate.

What I claim as new, and desire to secure by Letters Patent, is—

The within described process of manufacturing light carbonate of magnesia which process consists in mixing magnesia and the bicarbonate of a fixed alkali in about the proportion of ten parts of magnesia to thirty-two parts of the bicarbonate, then adding to the mixture about two hundred and fifty parts of water, then raising the temperature to about 65° centigrade under agitation and finally collecting the light carbonate of magnesia formed substantially as described.

In testimony whereof I have hereunto set my hand in the presence of two subscribing witnesses.

HERMANN ENDEMANN.

Witnesses:
WM. C. HAUFF,
E. F. KASTENHUBER.